United States Patent [19]

Johnson et al.

[11] Patent Number: 4,827,334
[45] Date of Patent: May 2, 1989

[54] OPTICAL SYSTEM AND METHOD FOR IMAGE SAMPLING IN A VIDEO PROJECTION SYSTEM

[75] Inventors: Richard H. Johnson, Cupertino; Martin A. Kykta, Burlingame; Steven M. Jarrett, Los Altos, all of Calif.

[73] Assignee: Electrohome Limited, Kitchener, Canada

[21] Appl. No.: 120,557

[22] Filed: Nov. 13, 1987

Related U.S. Application Data

[63] Continuation-in-part of Ser. No. 899,002, Aug. 22, 1986, and a continuation-in-part of Ser. No. 898,617, Aug. 21, 1986, abandoned.

[51] Int. Cl.$^4$ .................. H04N 9/31; H04N 5/74
[52] U.S. Cl. ................................. 358/60; 358/61; 358/230; 358/231; 350/401; 350/173
[58] Field of Search ............... 358/60, 61, 62, 64, 358/230, 231-233, 237, 250; 350/401, 402, 403, 408, 171, 173

[56] References Cited

U.S. PATENT DOCUMENTS

| | | | |
|---|---|---|---|
| 3,497,283 | 6/1970 | Law | 350/173 |
| 3,894,182 | 7/1975 | Yamamoto et al. | 358/231 |
| 4,191,456 | 3/1980 | Hong et al. | 358/61 X |
| 4,223,354 | 9/1980 | Noble et al. | 358/233 |
| 4,464,018 | 8/1984 | Gagnon | 358/61 X |
| 4,586,053 | 4/1986 | Hughes | 358/237 X |
| 4,611,245 | 9/1986 | Trias | 358/231 X |
| 4,650,286 | 3/1987 | Koda et al. | 350/402 X |
| 4,682,311 | 7/1987 | Matsubayashi et al. | 350/401 X |
| 4,689,780 | 8/1987 | Ohara et al. | 350/402 X |
| 4,730,899 | 3/1988 | Kime et al. | 350/173 |
| 4,749,259 | 6/1988 | Ledebuhr | 350/402 X |
| 4,769,712 | 9/1988 | Polaert | 358/60 X |

OTHER PUBLICATIONS

A. Jacobson, "A New Color-TV Projector", Apr. 1977, SID 77 Digest, pp. 106-107.
Ledebuhr, "Full-Color Single-Projection-Lens Liquid-Crystal Light-Valve Projector", SID Digest of Technical papers, May 1986, pp. 379-382.
Gold and Ledebuhr, "Full Color Liquid Crystal Light Valve Projector", Proc. SPIE Int. Soc. Opt. Eng., vol. 526, 1985, pp. 51-58.

Primary Examiner—James J. Groody
Assistant Examiner—E. Anne Faris
Attorney, Agent, or Firm—Majestic, Parsons, Siebert & Hsue

[57] ABSTRACT

An optical system and method for image sampling in a video projection system is provided. A beam of illumination light is passed through a first beam-splitting polarizer to provide a first beam of a first polarization state and a second beam of a second polarization state. The first beam is passed through a second beam-splitting polarizer which is oriented at 90° with respect to the first prism. The light from the second prism is then provided to a modulation device which produces a polarization modulated image in reflected outgoing light. The reflected outgoing light is passed through the second prism such that a first portion is directed to an image display screen and a second portion, which contains an image sample, is directed toward the first prism. The image sample is reflected by the first prism and provided to an image detector which detects characteristics of the sample. The detected characeristics are utilized to control the outgoing light.

21 Claims, 3 Drawing Sheets

OPTICAL SYSTEM AND METHOD FOR IMAGE SAMPLING IN A VIDEO PROJECTION SYSTEM

This application is a continuation-in-part of copending application Ser. No. 06/899,002 filed Aug. 2, 1986, and a continuation-in-part of copending application Ser. No. 06/898,617 filed Aug. 21, 1986 now abandoned.

BACKGROUND OF THE INVENTION

1. Field of the Invention

The present invention relates to optical systems for image sampling and, in particular, to an optical system and method for sampling a secondary, optical image in a video projection system for the purpose of controlling the projected primary image.

2. Discussion of the Prior Art

To project a high quality, high resolution display utilizing a color video projection system, it is necessary to converge accurately and to maintain in registration the individual projected primary color images over the entire display area.

A color projection display system which provides for image registration is disclosed by Ledebuhr, "Full-Color Single-Projection-Lens Liquid-Crystal Light-Valve Projector", SID 86 Digest, p. 381.

In the projection display system described by Ledebuhr, illumination light from a xenon arc lamp is directed toward a liquid crystal light valve system through a reflector and illumination optical system. The illumination light passes through a first beam-splitting polarizing prism that prepolarizes the light. S-polarized light is rejected from the system at this point and p-polarized light is transmitted. A second identical beam-splitting polarizing prism, oriented at 90° with respect to the first prism, sees the light incident from the first prism as s-polarized and, therefore, reflects it toward the liquid crystal light valves. The s-polarized light from the second prism is first directed through a 45° blue reflecting dichroic filter. Green and red wavelengths are transmitted by this filter and next encounter a 45° red reflecting dichroic filter. This second filter reflects the red light and transmits the green. The green light is then transmitted directly to a "green" liquid crystal light valve. The incoming red and blue light beams are each reflected to their respective liquid crystal light valves. Thus, the s-polarized illumination light from the second prism is split into three individual primary color beams (blue, red, green), each of which enters a separate reflective liquid crystal light valve for its corresponding primary color channel. The light from an image on an individual CRT associated with each color channel is directed to the photoconductive region of its light valve. Thus, upon reflection by the liquid crystal light valves, the outgoing light contains a polarization modulated image that is a replica of the image on the CRTs. This light then retraces its way back through the color filter assembly. The red and green modulated beams are recombined at the red reflecting filter and these are then recombined with the blue modulated beam at the blue reflecting filter. The light from the three channels now shares the same common axis that it did before polarization modulation. This recombined light passes back through the second polarizing prism where p-polarized light is transmitted and s-polarized light is reflected back toward the arc lamp illumination light source. The light transmitted by the second prism now consists of modulated light containing the primary color light image which is passed through a wide-angle projection lens to a display screen.

As stated above, to provide a high quality, high resolution display image, it is necessary to maintain accurately in registration the three individual projected primary color images over the entire screen area. The CRTs of the system described by Ledebuhr contained focus and astigmatism coils for spot shape programming, as well as additional deflection coils which are used to dynamically shape the three images. While this produces a full-color registered image on the display area, thermal and electrical drifts can cause image misregistration.

In order to reduce the drift to zero, the system described by Ledebuhr includes a feedback loop which is used to maintain the registration of the three primary color images. Three position-sensitive photodetectors are mounted at the display screen, outside the display area, to monitor the position of three projected target patterns that are generated during the vertical blanking interval of the display. Position signals from these three sensors are used to provide correction signals to the CRT deflection coils, which independently position the location of each of the three color images.

A major deficiency of the image registration correction technique described by Ledebuhr is the fact that it greatly reduces the mobility of the projection system. That is, since the three photodetectors utilized for image correction are mounted at the projection screen, which in most cases is permanently mounted, the projection system can be utilized only in conjunction with that screen or one that includes similar sensors. It would be highly desirable to provide a projection system which is transportable and still provides image registration correction.

SUMMARY OF THE INVENTION

It is, therefore, an object of the present invention to provide a color light valve projection system having an internal image sampling and error correction feature. The sample image is taken from light which is typically rejected from the system rather than being taken from the primary projected image.

This and other objects of the invention are accomplished by providing an optical system and method for sampling an image such as that generated by a light valve projection system of the type wherein illumination light is passed through polarizing prisms and then directed to a light modulation device which receives a light image and provides an intensity modulated optical image as outgoing light, the outgoing light being passed through a projection lens to display the optical image. According to the present invention, a portion of the outgoing light is sampled prior to the projection lens. The sampled portion is directed to a detector which detects a characteristic of the outgoing light. The detected characteristic is utilized to control the outgoing light which passes through the projection lens for display.

DETAILED DESCRIPTION OF A PREFERRED EMBODIMENT

Figure 1:
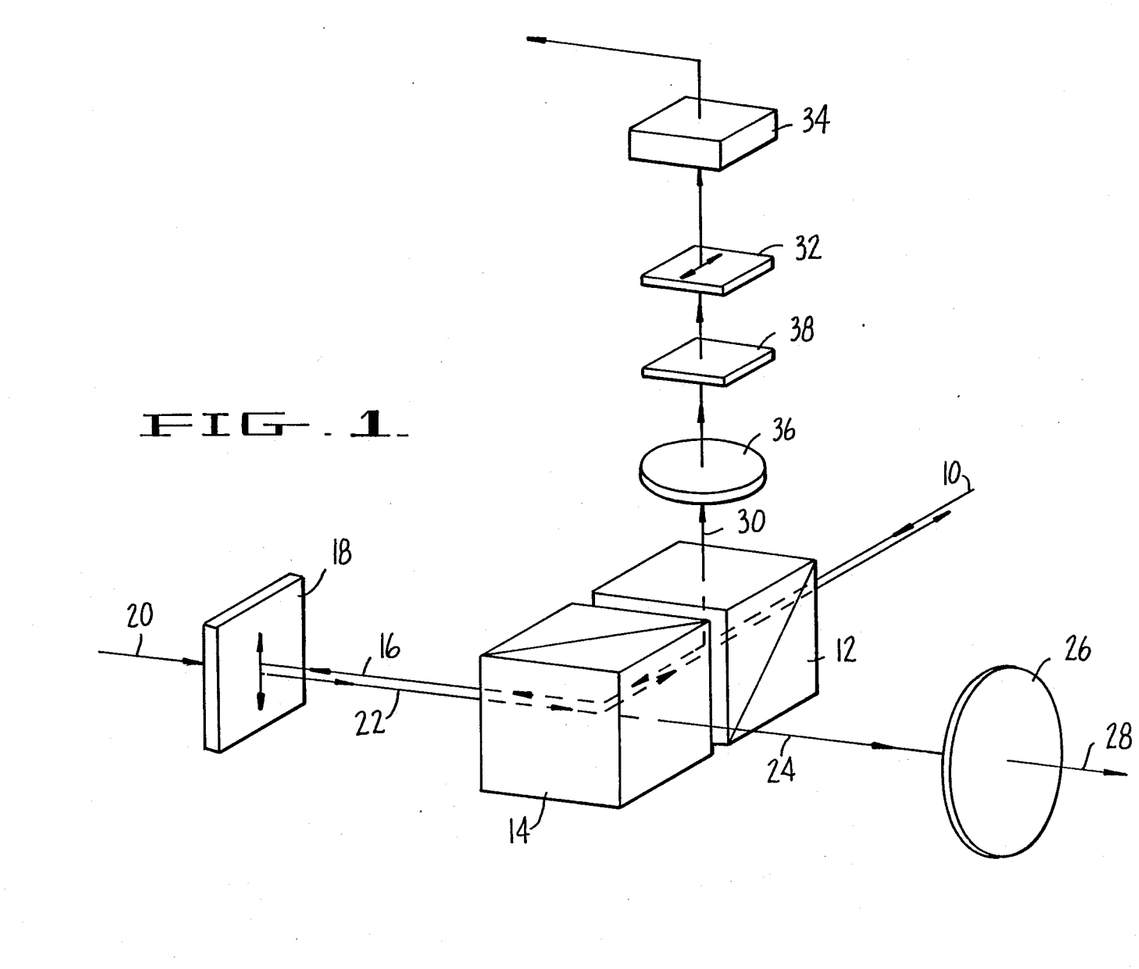
FIG. 1 is a schematic diagram illustrating the basic concept of the present invention.

FIG. 1 illustrates the basic concept of the present invention in the context of a light valve projection system. In a typical light valve projection system, illumination light 10 is passed through a beam-splitting prepolarizing prism 12 which reflects a first light beam of a first polarization state and transmits a second light beam of a second polarization state. The first beam is discarded; the second beam is directed to a second beam-splitting polarizing prism 14 which is oriented at 90° with respect to the first prism 12. Because of its orientation, the second prism 14 sees the incoming light from the first prism 12 as being of the first polarization state and, thus, reflects it, as beam 16 in FIG. 1 toward modulation device 18. Modulation device 18 also receives a light image 20 and provides a polarization modulated optical image as outgoing light 22. The outgoing light 22 from modulation device 18 is passed back through the second prism 14. A resulting primary projected image 24 is passed through projection lens 26 which focuses the primary projected image 24 for display.

As shown in FIG. 1, according to the present invention, an optical system is provided for sampling the outgoing light 22 before it passes through the projection lens. The sample image 30 is directed to a detector 32 which detects one or more characteristics of the image. The detected characteristics are then utilized by a controller 34 to control the primary projected image 24 being passed through the projection lens 26.

For example, the detector 32 may detect image brightness in different areas of the sample image 30. Since the sample image is a replica of the primary projected image 24, these detected brightness characteristics can be used to control the brightness of the projected image 24.

In full-color projection systems, the detector 32 may detect the registration characteristics of a sample image for each projected individual color; these characteristics may then be used to insure accurate registration of the individual color images in the projected display.

The optical system shown in FIG. 1 serves two purposes. The first purpose is to prepolarize illumination light 10 and reduce its cone angle for passage through the second beam-splitting polarizing prism 14. The result is a clearer, more distinct image than if a single beam-splitting polarizer is used. The second purpose, and the most important, is to use normally wasted light in accordance with the present invention to generate the secondary sample image 30. This secondary sample image is used to control the primary projected image.

The result of the utilization of the above-described sampling system is a more compact and transportable video projection system than has been available in the past.

The optical system of the present invention relies on utilizing a particular beam of light that is reflected by the two polarizing, beam-splitting prisms 12 and 14. This light beam is routinely found in all light valve projection systems of this type, but is normally discarded. A key feature of the present invention is the recognition that this "waste" light contains an exact replica of the primary projected image 24 and that, if this replica is used, a secondary sampling image 30 is created without inserting any additional elements into the primary projected beam 24.

In the system shown in FIG. 1, the illumination light 10, which becomes polarized after passing through the first polarizing prism 12, is reflected onto the modulation device 18 by the second polarizing prism 14. At this point, the light 16 is s-polarized with respect to the second polarizing prism 14. After being modulated by the modulation device 18, the outgoing light 22 is reflected back onto itself by a high reflectance mirror that makes up one layer of the modulation device 18.

A portion of the outgoing light 22 reflected from modulation device 18 is p-polarized with respect to the second polarizing prism 14. This portion of outgoing light 22 is the "positive" image. Most of this light will pass through the second prism 14 and through the projection lens 26 as the primary projected image 24. However, because of inherent limitations of the second polarizing prism 14, part of the positive image is reflected by prism 14 instead of being transmitted. This reflected portion, approximately 2–3% of the p-polarized portion of outgoing light 22, is s-polarized with respect to the first prism 12 and, thus, is reflected upwardly toward detector 32 as part of sample image 30.

The remaining portion of outgoing light 22 reflected from modulation device 18 is s-polarized with respect to the second polarizing prism 14. This portion of outgoing light 22 is the "negative" image and is reflected by prism 14. Because it appears to be p-polarized with respect to the first prism 12, most of this light passes back through the first prism 12 toward the source of illumination light 10. However, because of inherent limitations of the first prism 12, part of the negative image, approximately 2–3% of the s-polarized portion of outgoing light 22, which is now p-polarized with respect to the first prism 12, is reflected upwardly toward detector 32 as part of sample image 30 instead of being transmitted.

A lens 36 is provided to produce a reduced size sample image at the detector 32. A polarizer 38 is inserted between lens 36 and detector 32. The purpose of polarizer 38 is to discriminate between the positive and negative images which, as described above, are both present in the sample image 30. Without polarizer 38, the positive and negative images combine in such a way that the contrast ratio of the resulting sample image 30 would be nearly zero. However, with all of the elements present as shown in FIG. 1, a high contrast replica of the primary projected image 24 can be produced. It is then a relatively easy matter to select an imaging lens 36 that produces the correct magnification ratio to match the size of detector 32.

Figure 2:
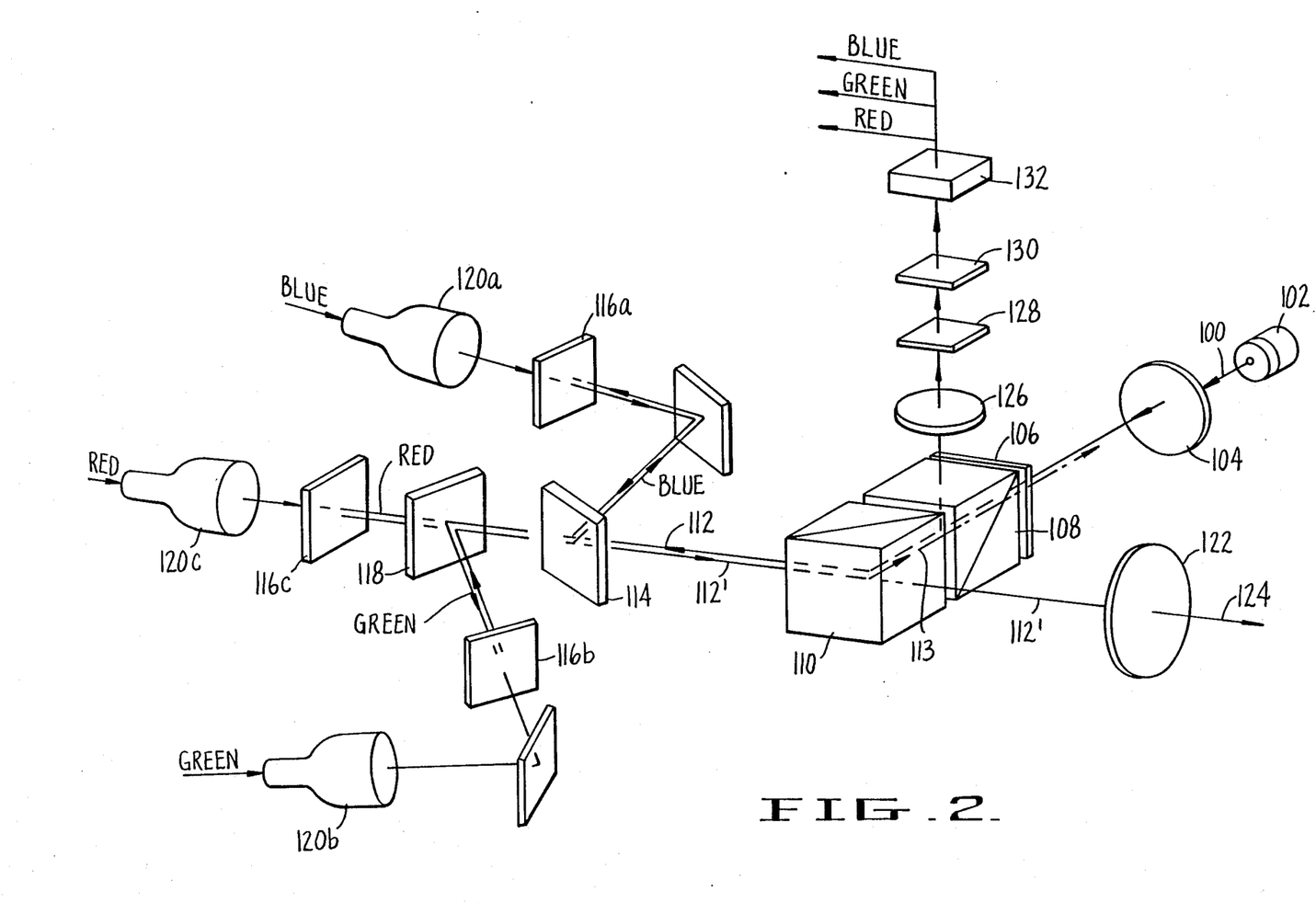
FIG. 2 is a schematic diagram illustrating a three color light valve projection system which utilizes the image sampling technique of the present invention.

FIG. 2 illustrates the application of the optical sampling system of the present invention to a three-color liquid crystal light valve projection system. As shown in FIG. 2, white illumination light 100 from a xenon arc lamp 102 is passed through a collecting lens 104 and a UV filter 106 before being provided to a first Mac Neille polarizing beam-splitting prism 108. S-polarized light is rejected from the system at this point and p-polarized light is transmitted to a second Mac Neille polarizing beam-splitting prism 110 which is oriented at 90° with respect to the first prism 108. Because of the orientation of the second prism 110, the incident light from the first prism 108 is seen as s-polarized and is reflected. The reflected s-polarized light 112 from the second prism 110 is directed to a blue reflecting dichroic mirror 114 which reflects blue light to a liquid crystal light valve 116a via reflector 115 and transmits red and green light. The transmitted red and green light is directed to a green reflective dichroic mirror 118 which reflects green light to a second liquid crystal light valve 116b and transmits red light to a third liquid crystal light valve 116c. Each liquid crystal light valve 116a-c is of the birefringent reflective type disclosed by Ledebuhr and which is well known in the art, and which, in and of itself, does not constitute a significant element of the present invention. Suffice it to say that each liquid crystal light valve 116a-c has a cathode ray tube (CRT) 120a-c of corresponding color associated with it. The color image from each CRT is provided to the photoconductive region of its respective liquid crystal light valve such that upon reflection by the light valve, the outgoing light contains a polarization modulated image that is a replica of the image on the CRTs. The three primary color, modulated light images retrace their paths to become a single outgoing light beam 112' which contains a recombined full-color image comprising the red, green and blue (RGB) images from the three CRT channels.

As described above with respect to FIG. I, in accordance with the present invention, this recombined RGB optical image light output 112' is directed back through the second beam-splitting prism 110. A part of the p-polarized portion of light output 112', typically 2%-3%, is reflected by the second prism 110 and directed back to the first prism 108. Because the first prism 108 "sees" this light as s-polarized it is reflected upwardly as the positive portion of sample image 125. The remainder of the p-polarized portion of light output 112' is transmitted by prism 110 to a projection lens 122 which focuses a primary optical image 124 on a display screen (not shown). The s-polarized portion of light output 112' is reflected by second prism 110 toward first prism 108. A majority of this light is transmitted by first prism 108. However, part, typically 2%-3%, of the s-polarized portion of light output 112 which is reflected by second prism 110 is also reflected upwardly by first prism 108 as the negative portion of sample image 125.

The combined positive and negative portions of the light output 112' which are reflected upwardly by prism 108 as sample image 125 represents a replica of the primary projected full-color image 124 provided to the display screen. This optical sample 125 is directed upwardly by the prepolarizing prisms 108, through a lens 126 and polarizer 128 (as described above with regard to FIG. 1), to CCD detector array 130 which detects characteristics of the sample image 125. The output of CCD detector array 130 is provided to a control circuit 132 which utilizes the detected characteristics to control the projected primary image 124. For example, as shown in FIG. 2, control circuit 132 can generate individual outputs for each of the three color channels to control the registration of the three color images in the projected display.

Figures 3, 4:
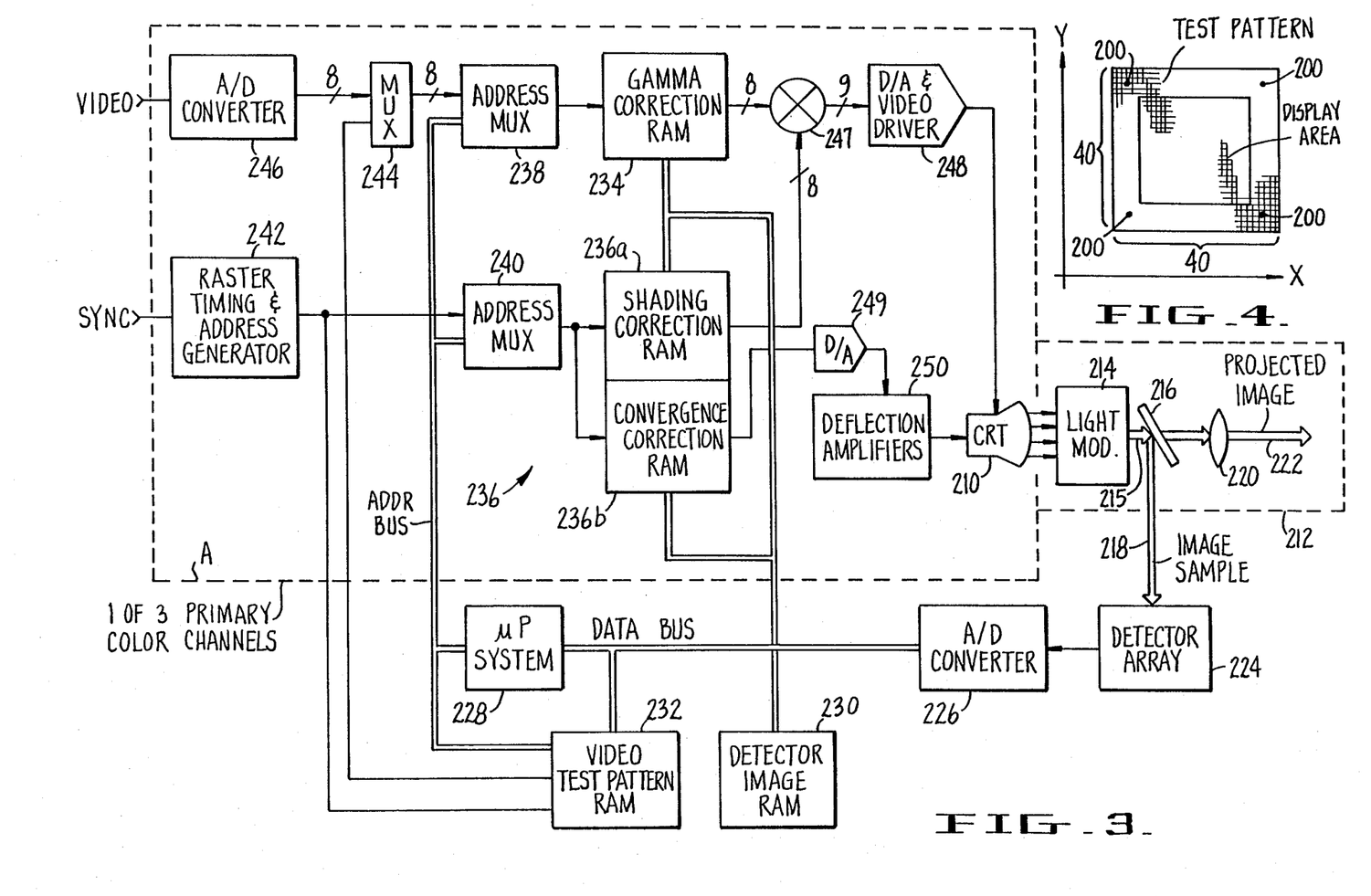
FIG. 3 is a schematic block diagram illustrating a system for automatically controlling image registration, brightness and gamma correction in a full-color light valve projection system.
FIG. 4 is a schematic diagram illustrating a registration test pattern utilized in conjunction with the FIG. 3 system.

In the preferred embodiment, control circuit 132 is of the type illustrated in FIG. 3.

FIG. 3 schematically illustrates a typical full-color light valve projection system. The dotted line A in FIG. 3 encloses one of three identical primary color channels, each of which relies on a CRT 210 to generate a primary color light image which is provided to an optical display and image sampling system 212.

The optical display and image sampling system 212 shown in FIG. 3 includes a light modulation system 214 which receives the individual light images from the three RGB CRTs and combines them to provide an intensity modulated output light beam 215 which contains a full-color image. The output light beam 215 is provided to an optical sampling system 216 which operates on the output light beam to provide an image sample 218 which is directed toward a detector array 224. Another portion of the output light beam is directed through a projection lens 220 to provide a primary projected image 222 for display.

As further shown in FIG. 3, the image sample 218 is provided to the image control system of the present invention. The image sample 218 is first directed to a CCD detector array 224 which is linear over the range of light levels of the output light beam from the light modulation system. The NXM CCD array 224 provides a geometric reference for the projected display image 222. The analog output of detector array 224 is provided as an input to a conventional 8-bit video flash A/D converter 226 which in conjunction with detector image RAM 230, takes a "snapshot" of the input. That is, the 8-bit output signal from A/D converter 226, which includes information relating to the intensity and registration of the primary projected image 222 with respect to the CCD reference, is provided to a data bus associated with microprocessor system 228 whereby it is mapped 1:1 into NXM detector image RAM 230. Detector image RAM 230 is actually an 8 plane deep RAM stack, each of the stacked RAMs being NXM, corresponding to the NXM configuration of the CCD detector array 224. Also connected to the data bus are a video test pattern RAM 232, a gamma correction RAM 234 and a combined RAM 236 comprising shading correction RAM 236a and convergence correction RAM 236b. An output of microprocessor system 228 is connected to address multiplexers 238 and 240 which provide address information to gamma correction RAM 234 and combined convergence correction/shading correction RAM 236, respectively. A video test pattern RAM 232 receives output address information from raster timing and address generator 242 and provides video test pattern output data to multiplexer 244. A second input to multiplexer 244 is provided by A/D converter 246 which receives a video input signal. Raster timing and address generator 242 receives a synchronization input and provides a second input to address multiplexer 240. Output data from gamma correction RAM 234 and shading correction RAM 236a is provided via multiplier 247 to D/A converter and video driver 248 which provides control signals to its associated CRT 210. Output data from convergence correction RAM 236b is provided to deflection amplifiers 250 which control the associated CRT 210 to provide accurate registration of the output image.

To insure accurate registration of three primary color images generated by the respective CRTs, at initial power up of the projection system an input selector associated with microprocessor system 228 selects one color video source while the other two colors are shut down. Processor system 228 then locates a desired registration test pattern for that color in video test pattern RAM 232 and displays it. The displayed test pattern is sampled as described above and the correction values are loaded into convergence correction RAM 236b. The same procedure is then repeated sequentially for each of the other two colors.

As shown in FIG. 4, in the preferred embodiment, the test pattern for image registration establishes the location of 1600 test pattern zones comprising a 40×40 grid. The test pattern includes a dot 200 of a desired color which is displayed just outside the four corners of the display area. During the initialization process for the projection system, microprocessor system 228 aligns the projected image for each of the three CRTs to correspond to a prescribed geometry referenced to CCD array 224 so that corresponding dots for each color are detected at the same location on detector array 224, the result being that there is initial accurate registration of the three color images. Thus, the geometry of each image is corrected to correspond to the detector array, rather than to one of the images, as is the case in prior art registration systems. This dot position information detected by array 224 is loaded into detector image RAM 230.

During subsequent normal operation of the projection system, each separate color image is periodically monitored by providing a sample image 218 for that color to the detector array 224. The corner dot positions for that sample image are loaded into detector image RAM 230. Processor system 228 then compares the sample image information from detector image RAM 230 with the initial test pattern position information for that color which is stored in video test pattern RAM 232. Any differences between the actual position of the corner dots as detected by array 224 and the desired dot positions as reflected by the test pattern information is resolved by the microprocessor system 228 by updating convergence correction RAM 236b with new values. The correction output from convergence correction RAM 236b is provided via D/A converter 249 to deflection amplifiers 250 to correct CRT 210 to provide accurate registration for that color.

For automatic brightness and gamma correction, two periodically-implemented, independent processes occur simultaneously. First, incoming video is digitized into eight bit values and then remapped to other eight bit values by a look up table contained in the gamma correction RAM 234. Second, an eight bit value, corresponding to each unique picture element, modulates the gain of the video stream at the proper time, to correct for any brightness variations in the display.

This is accomplished by filling both the shading correction RAM 236a and the gamma correction RAM 234 with one half full scale values. Then the output of the CRT for that particular color is sampled and the image sample is provided to detector array 224. The characteristics of the sample image determined by the detector array 224 are loaded into detector image RAM 230 and compared with an appropriate video test pattern image from video test pattern RAM 232. Any brightness variations are measured by microprocessor system 228 and correction factors are generated and loaded into the shading correction RAM 236a. At the end of this step, the projected image will consist of a flat field with no discernible brightness variations.

Next, gamma correction RAM 234 is filled with full scale values and the resultant display image brightness is measured. This is done to determine the minimum and maximum display brightness.

When the minimum and maximum points are known, then gamma correction RAM 234 is loaded with values which provide equal 1/255 increments between the minimum and maximum points. Once gamma correction RAM 234 is full, then the entire process is repeated for each color channel. When this process is completed for each channel, the projected display image has linear grey-scale accuracy, color balance, and uniform brightness over the entire display area.

It should be understood that various alternatives to the system described herein may be employed in practicing the present invention. It is intended that the following claims define the invention and that the structure within the scope of these claims and their equivalents be covered thereby.

What is claimed is:

1. A method of sampling an optical image such as that generated by a video projection system of the type wherein illumination light is passed through a polarizing means and then directed to a light modulation device which receives a light image and provides an intensity-modulated optical image as outgoing light, the outgoing light being passed through a projection lens to display the optical image, the method comprising:
   sampling a portion of the outgoing light prior to the projection lens;
   directing the sampled portion to a detector which detects optical image registration of the outgoing light; and
   utilizing the detected image registration characteristic to control the outgoing light passed through the projection lens.

2. A method as in claim 1 wherein said detector also detects image brightness, and wherein the utilizing step also utilizes the image brightness to control the outgoing light passed through the projection lens.

3. A method of sampling an optical image such as that generated by a video projection system of the type wherein illumination light is passed through a polarizing means and then directed to a light modulation device which receives a light image and provides an intensity-modulated optical image as outgoing light, the outgoing light being passed through a projection lens to display the optical lens, the method comprising:
   sampling a portion of the outgoing light prior to the projection lens wherein the sample portion is taken from the outgoing light utilizing a MacNeille prism;
   directing the sampled portion to a detector which detects a characteristic of the outgoing light; and
   utilizing the detected characteristic to control the outgoing light passed through the projection lens.

4. An optical system for sampling an optical image such as that generated by a light valve projection system of the type wherein illumination light is passed through polarizing means and then directed to a liquid crystal light valve system which receives a light image and provides an intensity-modulated optical image as outgoing light, the outgoing light being passed through a projection lens to display the optical image, the optical system comprising:
   means including a polarizing beam-splitting device for sampling a portion of the outgoing light prior to the projection lens;
   a detector which receives the sampled portion and detects a characteristic of the outgoing light; and
   a controller which utilizes the detected characteristic to control the outgoing light passed through the projection lens.

5. An optical system as in claim 4 wherein the detected characteristic is image registration.

6. An optical system as in claim 4 wherein the polarizing beam-splitting device comprises a MacNeille prism.

7. A method for image sampling in a light valve projection system, the method comprising:
passing a beam of illumination light through a prepolarizing prism such that the light is split into a first beam of a first polarization state and a second beam of a second polarization state;
passing the first beam through a second beam-splitting polarizing prism oriented at 90° with respect to the prepolarizing prism;
directing the output beam from the second prism to a modulation device which produces an intensity-modulated image which is reflected as outgoing light,
passing the outgoing light through the beam-splitting polarizing prism such that a first portion is directed to a projection screen to display the modulated image and a second portion is directed to the prepolarizing prism;
directing the second portion from the prepolarizing prism to an image detector which detects a characteristic of the second portion; and
utilizing the detected characteristic to control the first portion.

8. A method as in claim 7 wherein the prepolarizing prism is a Mac Neille prism.

9. A method as in claim 8 wherein the second prism is a Mac Neille prism.

10. A method for image sampling in a full-color light valve projection system, the method comprising:
passing a beam of illumination light through a first polarizing beam-splitting device such that the light is split into a first beam of a first polarization state and a second beam of a second polarization state;
passing the first beam through a second polarizing beam-splitting device oriented at 90° with respect to the first beam-splitting device;
directing light from the second beam-splitting device to means for splitting the light into red, green and blue beams;
directing each of the red, green and blue beams to an individual light modulation device which receives an image of corresponding color and produces an intensity-modulated image which is reflected from the modulation device;
recombining the red, green and blue intensity-modulated images to form outgoing light which contains a full-color image;
directing the outgoing light to a projection lens;
sampling a portion of the outgoing light prior to the projection lens;
directing the sampled portion to a detector which detects from the sampled portion the registration of the red, green and blue images in the outgoing light; and
utilizing the detected image registration to control said registration in the outgoing light.

11. A method as is claim 10 wherein the sampled portion comprises light of the first polarization state and light of the second polarization state.

12. A method as in claim 11 including the further step of passing the sampled portion through a polarization device located prior to the detector such that the sample portion arriving at the detector is of a single polarization state.

13. A method as in claim 10 wherein the first beam-splitting device is a MacNeille prism.

14. A method as in claim 13 wherein the second beam-splitting device is a MacNeille prism.

15. An optical system for sampling an optical image such as that generated by a light valve projection system of the type wherein illumination light is passes through polarizing means and then directed to a liquid crystal light valve system which receives a light image and provides an intensity-modulated optical image as outgoing light, the outgoing light being passed through a projection lens to display the optical image, the optical system comprising:
means for sampling a portion of the outgoing light prior to the projection lens;
a detector which receives the sampled portion and detects a registration of images within the outgoing light; and
a controller which utilizes the detected image registration to control the outgoing light passed through the projection lens.

16. In a projector of a type having a plurality of image forming devices and a plurality of light valves, one light valve associated with a single one of the image forming devices and receiving its formed image, a source of illumination, and optical means for directing the illumination in a beam toward the light valves, combining individual images on the light valves obtained from their associated image forming devices, and projecting a single combined image beam to a location outside of the projector, the improvement wherein said optical means comprising:
at least one passive optical element positioned in the path of the combined image beam that is characterized by inherently continuously directing a small proportion of the intensity of the combined image beam along a path in a direction that is different than that of the combined image beam,
a two-dimensional light detector positioned in the path of said small intensity beam, whereby the nature of the combined image beam may be monitored from within the projector, and
means receiving at least one signal from said detector for adjusting registration of the individual images in said combined image beam.

17. The projector according to claim 16 which additionally comprises means receiving at least one signal from said detector for adjusting the relative brightness of the individual images in said combined image beam.

18. The projector according to claim 16 wherein said optical element is further characterized by polarizing at least some of the light incident thereon and said small intensity beam is reflected therefrom.

19. The projector according to claim 16 wherein said optical element comprises a MacNeille prism.

20. A projector, comprising:
a plurality of image forming devices,
a plurality of light valves, each of the type that modulates light incident upon one surface by polarizing such light in accordance with an image incident upon an opposite surface thereof, each of said light valves being positioned to receive on its said opposite surface an image formed on one of said plurality of image forming devices,
a source of an illuminating light beam,
a first polarizing beam splitting device positioned in the path of said illuminating light beam, thereby to pass a portion of the illuminating beam intensity as a first polarized beam and reflect another portion of that intensity as a second polarized beam,
a second polarizing beam splitting device positioned in the path of said first polarized beam in a manner to reflect said beam onto said one surface of each of said plurality of light valves and receive light reflected therefrom in a composite image beam that is passed through said second device, said second device being characterized by reflecting a small portion of the intensity of the composite image beam in a direction substantially along the path of said first polarized beam to said first device by which it is reflected as a low intensity beam that is separated from the source and composite image beams, a light detector positioned in the path of said low intensity beam, and a projection lens positioned in the path of said composite beams, whereby light valve images contained in said combined beam may be projected onto a surface displaced from the projector while a reduced intensity version thereof is received by said detector for monitoring its characteristics.

21. The projector according to claim 20 wherein each of the image devices carries a different color component of a single image scene, and which additionally comprises means receiving a signal from said detector for maintaining said components spatially registered with each other.

* * * * *

UNITED STATES PATENT AND TRADEMARK OFFICE
CERTIFICATE OF CORRECTION

PATENT NO. : 4,827,334

DATED : May 2, 1989

INVENTOR(S) : Johnson et al.

It is certified that error appears in the above-identified patent and that said Letters Patent is hereby corrected as shown below:

Col. 8, line 39: "lens" should be --image--;

Col. 10, line 3: "passes" should be --passed--; and

Col. 12, line 2: "beams" should be --beam--.

Signed and Sealed this

Twenty-eighth Day of November 1989

Attest:

JEFFREY M. SAMUELS

Attesting Officer   Acting Commissioner of Patents and Trademarks